United States Patent [19]

Richards

[11] 4,275,864
[45] Jun. 30, 1981

[54] METHOD AND SYSTEM FOR COOLING A MOLD

[76] Inventor: Les W. Richards, 826 Orchard St., Racine, Wis. 53405

[21] Appl. No.: 158,726

[22] Filed: Jun. 12, 1980

[51] Int. Cl.³ .................... B29F 1/022; B29F 1/08; B99C 1/06
[52] U.S. Cl. .................................. 249/79; 425/547; 425/552; 425/577; 425/384; 264/327; 264/348
[58] Field of Search .............. 425/546, 547, 548, 549, 425/552, 577, 817, 384; 249/79; 264/327, 348

[56] References Cited

U.S. PATENT DOCUMENTS

| | | | |
|---|---|---|---|
| 2,631,351 | 3/1953 | Hoopes | 249/79 |
| 2,828,509 | 4/1958 | Smucker et al. | 425/552 |
| 3,224,037 | 12/1965 | Robbins et al. | 425/547 |
| 3,224,040 | 12/1965 | Bridges et al. | 425/547 |
| 3,235,908 | 2/1966 | Thompson | 249/79 X |
| 3,257,690 | 6/1966 | Scott | 249/79 X |
| 3,310,427 | 3/1967 | Cheney et al. | 425/548 X |
| 3,343,221 | 9/1967 | Yarrison et al. | 425/547 X |
| 3,384,159 | 5/1968 | Cgetli | 249/79 X |
| 3,482,815 | 12/1969 | Naturale | 249/79 X |
| 3,667,248 | 6/1972 | Carlson | 249/79 X |
| 4,091,069 | 5/1978 | Allen | 425/546 X |
| 4,196,855 | 4/1980 | Osema-Diaz | 425/549 X |

Primary Examiner—J. Howard Flint, Jr.
Attorney, Agent, or Firm—Arthur J. Hansmann

[57] ABSTRACT

A method and system for cooling a mold, including the steps of providing fluid flow connectors insertable into a mold for conducting the coolant into the mold. One of the connectors is made in one-piece and includes a threaded stem which threads into a mold opening, and that one-piece also includes two threaded openings which are disclosed transverse to the length of the stem and which align with passageways in the mold for attaching to two tubes extending in the passageways. The system in method is arranged for the alignment of the threaded openings with the passageways while the stem is fluid tightly threaded into the mold opening, and all of the connections are made on the interior of the mold. The threads on the stem are of one diameter which is the maximum pitch diameter of the threaded opening in the mold which receives the stem, and the stem is cut to the appropriate length and its remaining threads are then tapered for fluid tightly threading into the mold opening, all for the purposes mentioned above.

5 Claims, 7 Drawing Figures

METHOD AND SYSTEM FOR COOLING A MOLD

This invention relates to a method and system for cooling a mold. That is, it pertains to the manner in which a mold which is receiving molten material is cooled in order to have the molten material harden and to control the temperature of the mold.

BACKGROUND OF THE INVENTION

The prior art is already aware of methods and systems and the like which are utilized for cooling molds by directing a coolant into the interior of a mold handling molten material. In these prior arrangements, it is common practice to have flow tubes and connectors extending to the interior of a mold for fluid tightly conducting the coolant into and out of the mold interior. In these arrangements, the mold commonly has only blind passageways for receiving the connectors, and there is therefore a problem in threadedly connecting together the various connectors. In this regard, threaded members must be fluid tightly connected together and they must also be of extended lengths and be positioned such that they will adequately align with transverse blind passageways, for instance. In this art, any leakage in the coolant can cause an explosion in the mold, and also if the parts are not properly connected together, then there is expensive and time consuming dismantling and reworking or reassembly of the mold and the coolant connectors.

With further regard to this art, it should be understood that many molds and dies are, by necessity, custom built to the specifications and requirements of the individual part to be molded. This necessarily requires that the coolant connectors also be custom sized so that they extend to critical locations within the confines of the mold, all for the purpose of making the required connections and to be properly positioned in their critical locations.

Heretofore the art has resorted to a series of connectors which thread together while extending into the mold and thus hopefully they are fluid tight and are properly disposed in the critical positions mentioned. Examples of certain types of that prior art are found in U.S. Pat. Nos. 2,828,509 and 3,343,221 and 4,091,069. The last patent shows a threaded connector and it also shows another piece which extends into a mold for cooling the mold, but in that instance the threaded connector itself is not required to be disposed within the confines of the mold, as in the present instance. Also, the other two patents show the connectors extending exteriorly of the particular mold itself, and they are also significantly different in their structure and method in that they are not of a one-piece construction which includes a threaded stem, and they do not employ the method of establishing the desired length and taper on the threaded stem, both as disclosed herein and as pertained to this invention. Accordingly, those three examples of prior art are different from the present invention.

Another form of the prior art connectors is shown in FIG. 7 herein and it will be seen that there is a two-piece unit which can be disposed within a mold but which must be threaded together therein and this presents the problem which the present invention has solved. The parts in FIG. 7 present problems of accuracy of installation within the mold and of fluid tight connections and of avoiding damage to the parts or of leaving the threaded nipple part within the mold when the other threaded part is removed from the mold. In the latter situation, the entire mold must be disassembled to remove the nipple, or the nipple itself must be destroyed by drilling out or use of extractors. These procedures are time consuming and costly and they are therefore avoided by not tightening the parts completely and then there is possibility of coolant leakage or the problem of aligning the remaining parts is then presented.

A further background, it should be understood that in order to avoid unnecessary costs and handling time, these molds are designed as compactly as possible. Consequently, the tooling connectors or junctions are by necessity also very compact. Therefore, when two threaded parts of a compact nature are joined together, such as in FIG. 7, there is a risk of interference fit with the threaded ends of the nipple and tubes extending into the junction and thus the freezing of the piece within the junction or the inherent leaking at the junction or there may be similar problems. Leaks are of course very undesirable in that they can cause parts to be scrapped and they can make the molding area slippery and dangerous and they can even cause explosions if water comes into contact with molten metal. Many times molds weighing thousands of pounds must be entirely removed from the molding press and completely disassembled to repair a leaking coolant junction. With today's investment costs of molds and molding machinery, water cooling apparatus must be accurately installed and operate dependably. The present invention considers these problems and improves upon the prior art in the manners mentioned in the foregoing and in manners mentioned in the description of this invention.

Accordingly, it is an object of the invention to overcome the aforesaid problems of both installation and operation of the cooling method and apparatus in this art. Specifically, it is and object of this invention to provide a method and apparatus in a cooling system which is useable in all molds of various sizes and to have the apparatus easily installed and easily removed and reliable in its liquid tightness. In accomplishing these objectives, the connector and the method of the present invention is to provide a junction piece which has a threaded stem which can be cut to a desired length and tapered threads can then be formed on the end of the remaining stem and thus the entire junction can be of a proper length and can be fluid tightly positioned within the mold, all for aligning transverse threaded openings in the junction with transverse passageways in the mold.

More specifically, the present invention provides a method and apparatus for utilizing a one-piece coolant junction part which eliminates the risk of leakage which can be torqued to the proper tightness and can subsequently be removed as one-piece without leaving another piece in the mold, and the one-piece permits easy holding of the piece while it is cut to the proper length and its threads are tapered, all without requiring the clamping of a short nipple which can be distorted in shape while it is being reworked to the customized mold conditions mentioned above. Further, the junction piece of this invention is provided with a stem having a length of threads of uniform pitch diameter, and that permits the cutting of the stem to the proper length and the easy tapering of the remaining threads. The rethreading forces are only minimal in that the original threads only need to be shaved to form the taper and thus the surface finish on those threads is improved and therefore reduces leakage possibilities.

Other objects and advantages will become apparent upon reading the following description in light of the accompanying drawings.

DETAILED DESCRIPTION OF THE PREFERRED METHOD AND EMBODIMENT

Figure 1:
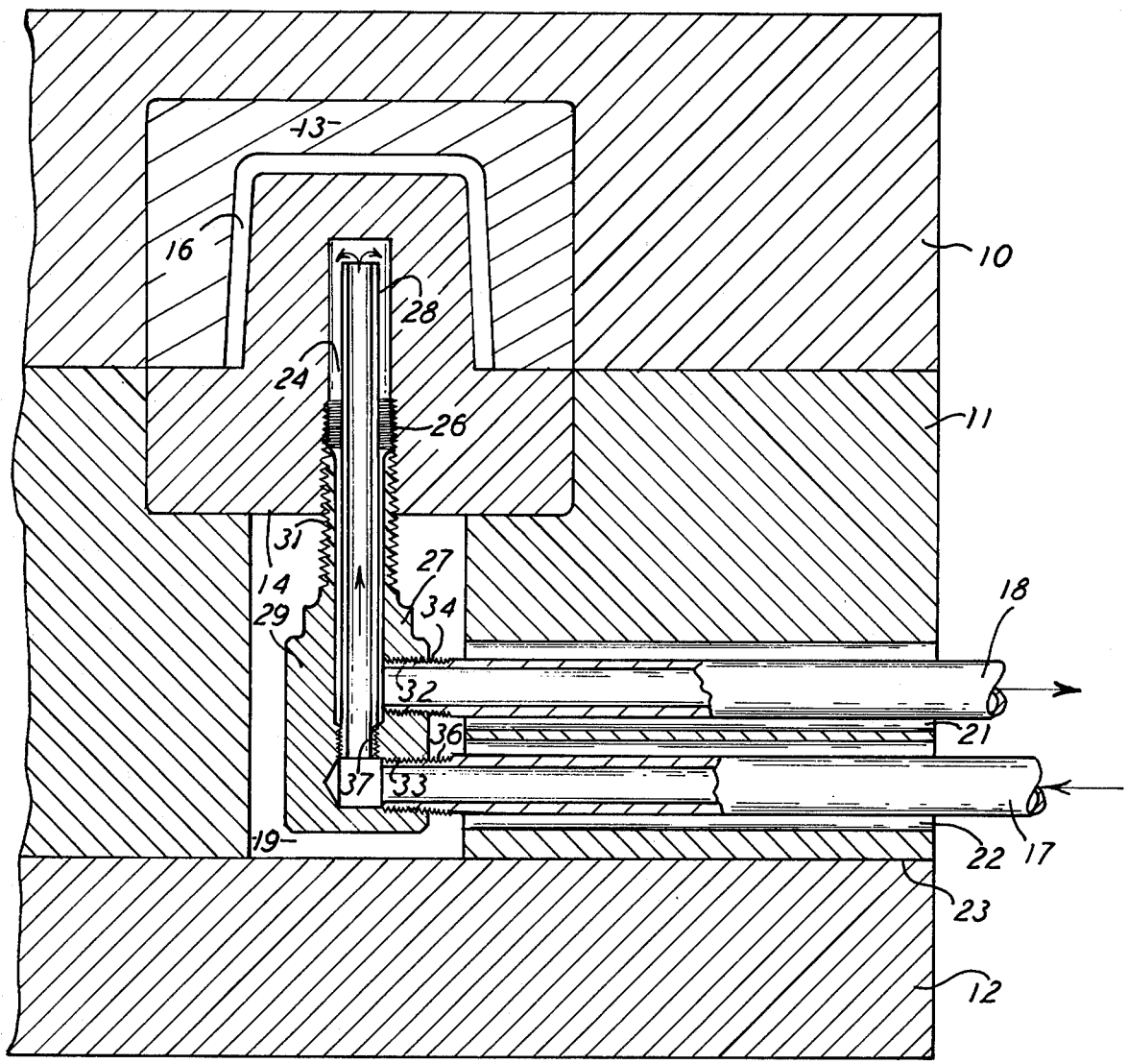
FIG. 1 is a sectional view showing the preferred apparatus of this invention mounted in an assembled mold.

FIG. 1 shows the several parts 10, 11, and 12 which form the bulk portions of a conventional type of mold. The mold also includes the parts 13, and 14 which are arranged to present the usual cavity 16 wherein the piece to be molded is formed by suitable introduction of molten material into the cavity 16 through a passageway not shown but all of which is conventional and will readily be understood by one skilled in the art. The problem and concern in this art is to cool the mold by introducing a coolant into the mold, such as at the part 14 as shown, and this is done by means of the connectors shown for conducting the coolant into the mold through the tube or pipe 17 and out of the mold through the tube or pipe 18. Thus, coolant will flow in the direction of the arrows shown on and adjacent to the connectors shown in FIG. 1.

For further background, it should be noticed that the mold portion 11 has an interior chamber 19 and it has two passageways 21 and 22 which extend from the exterior wall 23 and completely to the interior chamber 19, as shown. Further, when the mold is assembled as shown, it will be noticed that the chamber 19 is closed off by the mold portion 12 along the surface designated 23. The mold portion 14 has a cylindrical opening 24 extending therein, and at least one length thereof contains screw threads 26, and these threads are tapered and are of a standard configuration. The opening 24 and the chamber 19 are contiguous to each other, as shown.

FIG. 1 shows the connectors disposed within the mold part mentioned and for the purpose of conducting the coolant into and out of the interior of the mold. These connectors include the tubes 17 and 18 and a junction 27 and a tube 28 extending from the interior of the junction 27 and there-above, as seen in FIG. 1.

Figure 3:
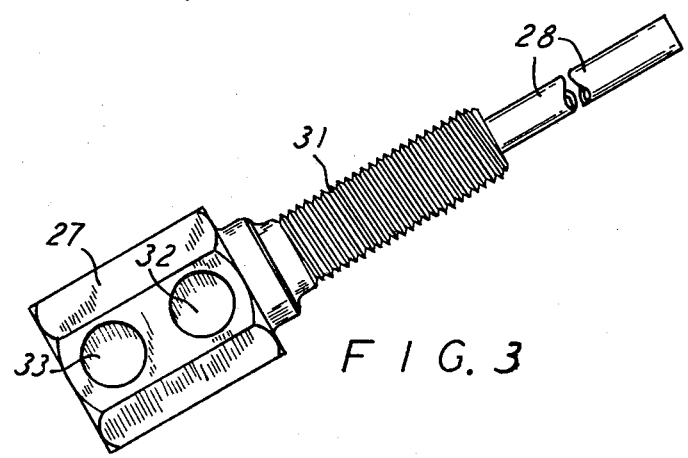
FIG. 3 is a side view of the junction unit of this invention shown in FIG. 1.
Figure 4:
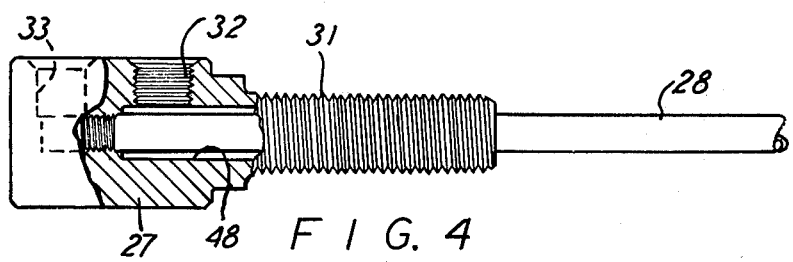
FIG. 4 is a side view of the junction unit of this invention shown in FIG. 1, with a part thereof broken away.

For a clear understanding of the method and apparatus of this invention, it will now be mentioned that the problem and concerns with respect to this art is to position the connectors on the interior of the mold, though all of the cavities and passageways described are in blind positions or interior. Nevertheless, it requires that the connectors be critically located and liquid tight so that there is no leakage in the coolant flowing into and out of the mold. To accomplish this, the junction 27 of this invention is made in one-piece to have its body portion 29 and its stem portion 31 integral with each other within the one-piece described and shown. It will be further seen and understood that the stem 31 is cylindrically shaped and is threaded along its entire external length and it threads into the threads 26 in the opening 24 in the mold portion 14. It will also be noticed that the junction 27 has two threaded openings 32 and 33 which have the axes thereof extending transverse to the elongate axis of the stem 31. Thus, in the assembly of the connectors shown, the problem and concern is to locate the connector part which threads into the threaded opening 26 in a position so that the threaded openings 32 and 33 will align with the longitudinal axes of the passageways 21 and 22; also that the tubes 17 and 18 can be threadedly connected in the opening 32 and 33 by means of the threads 34 and 36 on the exterior of the tubes 17 and 18. At this time it will also be noticed that the tube 28 has its lower end threaded at 37, and the interior of the junction 27 is likewise threaded for threadedly connecting with the threads 37 so that the incoming coolant can flow through the tube 28 and into the opening 24 and down through the hollow interior of the stem 31 and into the tube 18 and away from the mold assembly. For this purpose, it will be seen that the outer diameter of the tube 28 is less than the inner diameter of the hollow stem 31 and likewise of the passageway continuing in the junction body 29, as shown. FIGS. 3 and 4 further show the details mentioned above.

Figure 2:
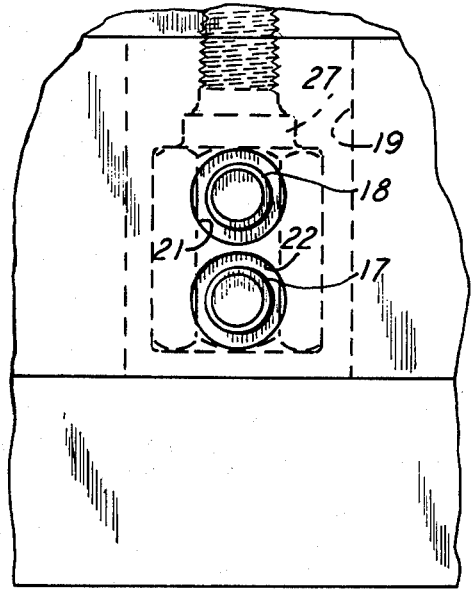
FIG. 2 is a right side elevational view of a fragment of FIG. 1.

FIG. 2 shows the right side view of a portion of FIG. 1, and it shows the passageways 21 and 22 with the tubes 17 and 18 extending therein. It also shows the junction member 27 and it shows the chamber 19 in the interior of the mold assembly. It will thus again be seen and understood that the junction 27 must be properly located in the chamber 19, thus is it must be threaded into the threaded opening 24 to the critical position so that the threaded openings 32 and 33 are on the longitudinal axis of the passageways 21 and 22, all to permit the tubes 17 and 18 to be connected with the junction 27.

Figure 5:
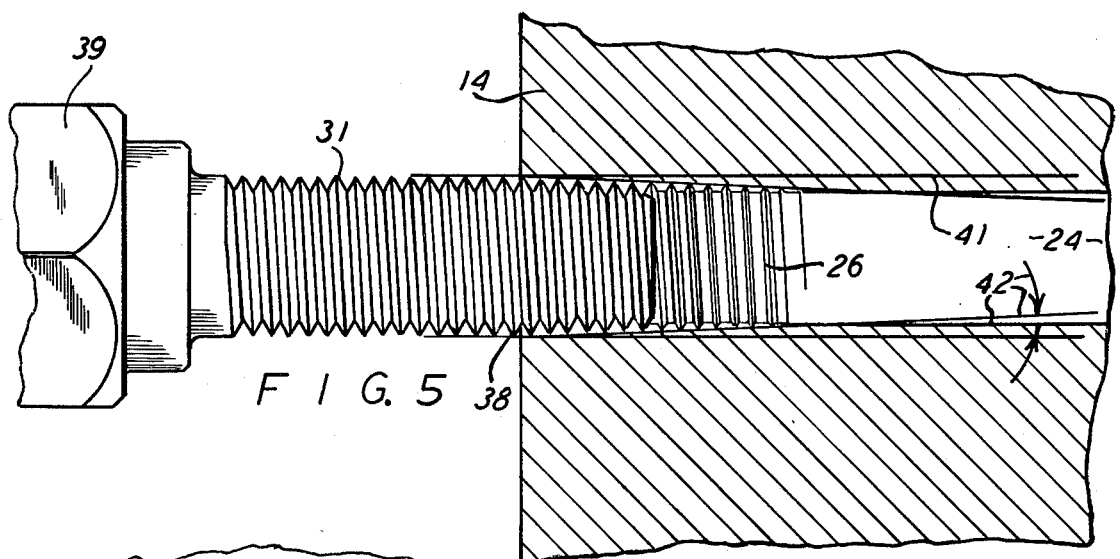
FIG. 5 is an enlarged sectional view of a portion of FIG. 1.
Figure 6:
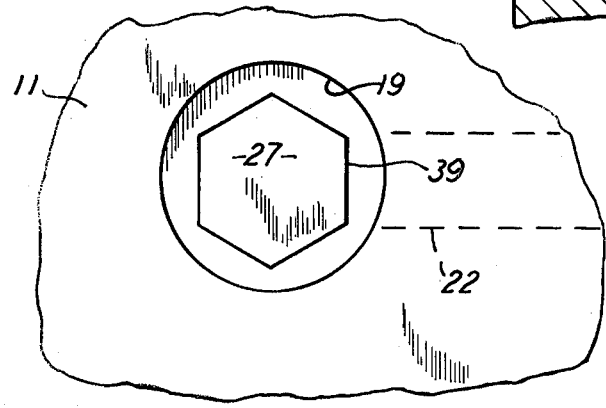
FIG. 6 is a bottom plan view of a fragment of FIG. 1.

To accomplish the aforementioned, both in method and apparatus, it will be seen and understood that the junction 27 has its stem 31 threaded with a uniform pitch diameter of thread along the entire length thereof. The operator will determine the desired adequate length of the final length for the stem 31, and he will then cut off the extending end of the stem 31, and it can be assumed that it has been cut off in the showings in FIGS. 1 and 5 but not necessarily in FIGS. 3 and 4. The amount to be cut off of course depends on the custom arrangement of the particular mold assembly, also that the threaded openings 32 and 33 will align with the passageways 21 and 22 while the stem 31 is liquid tight in the threads 26. After the final length of stem 31 is determined, as mentioned above, then the remaining uniform pitch diameter of threads on the extending end of the stem 31 are formed in a taper, such as shown in FIG. 5, so that they can fluid tightly thread into the tapered threaded opening and threads 26. To this point the apparatus is arranged and the method is carried out by initially threading the stem 31 into the threaded opening 26 to determine the position of the openings 32 and 33 with passageways 21 and 22. Next, the stem 31 is then cut off according to the requirement for repositioning the stem 31 in the opening 26 so that the threaded openings 32 and 33 are on the axes of the passageways 21 and 22. Before threading the stem 31 into the threads 26, the remaining extending end of the stem 31 is recut with standard threading die to taper the end threads 38. In this process, it will be noted that the junction 27, being of one-piece and having a multi flat-sided configuration with flat sides 39 in a hexagonal shape, can be secured in a grip or vise required for the formation of the tapered threads, and no damage is caused to the junction 27 while thus gripping it. FIG. 5 shows the straight or uniform diameter designated 41 indicating the largest thread in the threaded opening 26, and the taper is indicated by the lines and arrows designated 42, and that is the taper of both the threads 26 and also the taper 38 on the stem 31. Thus the stem 31 will go into the threaded opening 26 to the proper length and to be liquid tight therewith. The installation chamber 19 is formed in the mold portion 11 by drilling the chamber 19 therein, and then a standard socket wrench can fit into the chamber 19 and engage the hexagonal junction 39 for the tightening and removal of the junction 26, all as a single one-piece unit which is the desireable consequence of this invention. Because the junction 27 is a one-piece, when it is required that it be removed from the mold, it can be certain that all of the one-piece unit will be removed by unscrewing the junction 27 from the threaded opening 26, and that is in contrast to the prior art unit shown in FIG. 7 and described hereinafter.

Figure 7:
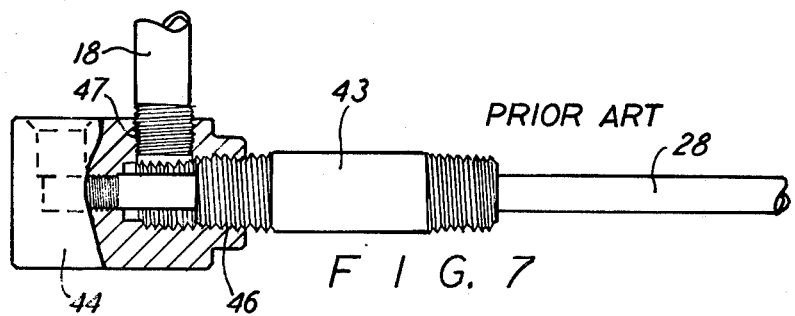
FIG. 7 is a side elevational view of a prior art arrangement, with a fragment thereof broken away.

To further understand the method and apparatus of this invention, FIG. 7 shows a prior art arrangement wherein there is a liquid connector piece in the form of a threaded nipple 43 which threadedly connects with another connector 44 by means of mutually threaded sections designated 46. The assembly in FIG. 7 also shows the tube 18 and the threaded sections between the piece 44 and tube 18, as designated at 47. It will therefore be understood that cooling connectors in almost every mold must be rethreaded to fit into the custom situations. In the case of the pipe nipple 43, it must be cut off to the desired length and then rethreaded with proper tapered threads to extend to the proper length and be fluid tight in the threaded opening 26. The cut-off and rethreading operation are the times when many leaks are caused. Since the nipple 43 is necessarily originally short, there is a problem and difficulty in holding it in a vise or chuck so that it can be cut to length and then rethreaded. This can cause the nipple to get out of circular shape and that invites dangerous leaking when installed.

Another disadvantage of the two-piece assembly of FIG. 7 is that in drilling and tapping the piece 44 to accommodate the nipple threads at 46, threads are removed at the area of the threads 47 and that leaves fewer threads at that location and therefore it jeopardizes the required fluid sealing.

After nipple 43 has been reworked as mentioned, again the operator will endeavor to install it in the mold in the position shown in FIG. 1, and upon tightening the assembly into the threaded opening 26, the operator can not be sure if the threads are tightening at the location 46 or directly in the hole 26. Of course if they are tighter in the hole 26 then at the location 46, then there is a problem in removing the assembly from the mold either for the needed alignments mentioned or for ultimate removal when the piece is cast, and at those times the nipple 43 can remain in the mold and must then be drilled therefrom or otherwise destroyed for removal. Because of this problem, the assembly of FIG. 7 is often only loosely positioned and it is therefore likely to leak.

In contrast, with the one-piece unit of this invention, and with the working of the stem 31 in length and tapering of threads, all as mentioned, the operator can fully tighten the one-piece unit for determining alignment of the openings 32 and 33 with the passageways 21 and 22 and he can confidently remove the one-piece unit 27 for necessary reworking to obtain the critical alignment required. In installing the one-piece unit 27, the operator can torque it in with confidence that all of the force is transmitted to the connection with the threads 26, and he will not receive any false readings or indications as to what is being tightened, as he normally receives with respect to the FIG. 7 arrangement.

Further, FIG. 4 shows that with the one-piece unit the length of threads 32 can be greater than the length of threads at 47, since there is no need for threads in the bore 48 as there is for threads 46 in FIG. 7. This again means that there is more security with regard to leakage in the connection between the pipe 18 and the threaded opening 32.

Finally, it will of course be understood that American standard taper pipe threads are used in these liquid pressure applications in mold work. The threads are cut at an angle of one degree 47 minutes per side, so that when they are tight they seal along the entire length of engagement. As shown in FIG. 5, with the lead and the maximum pitch diameter already cut in the stem 31, the rethreading torque is greatly reduced as only the taper must be shaved into the end threads after cutting stem 31 to length. The one-piece construction 27 allows for holding of the piece 27 by its body portion 29 while the threads 38 are being tapered, and this provides the operator with a very substantial holding area and greatly reduced rework torques which eliminate collapse or damaged sealing areas. The precut standard thread on the stem 31 also provides a guide to the threading die so that the taper goes on straight and square and, with reduced cutting force in the tapering, the surface finish of the threads is improved and provides the best seal. So, before taper cutting at 38, the junction 27 can be positioned sufficiently to threads 26 to allow estimating of cut off of stem 31.

What is claimed is:

1. In a mold cooling system of the type having a mold with an interior threaded opening and a contiguous chamber, and having liquid flow connectors disposed in said chamber and threaded into said opening for the flow of cooling liquid to and from said mold opening, and said mold having two elongate passageways extending transverse to the axis of said mold threaded opening and into said mold chamber, and having a liquid flow tube extending in each of said mold passageways and threaded into one of said connectors for the flow of liquid to and from said mold opening, the improvement comprising said flow connectors including a one-piece junction disposed in said mold chamber and having a threaded stem extending integral on said junction for fluid tightly threading into said mold opening and directing cooling liquid into said mold opening, said one-piece junction including two threaded openings with the axes thereof transverse the axis of said threaded stem for threaded connection with said tubes, said mold opening and said stem having mating tapered threading and said stem also having threads of a maximum pitch diameter the same as the maximum size of those of said opening, said threaded stem having a threaded length extending into said mold opening to be liquid tight therein while said junction two threaded openings are axially aligned with said mold passageways.

2. The mold cooling system as claimed in claim 1, wherein said one-piece junction includes a multi flat-sided configuration on its end opposite said threaded item, for gripping the flat-sided configuration in threading said junction into and out of said mold threaded opening and in tapering said stem threads.

3. The mold cooling system as claimed in claim 1 or 2, wherein said threaded stem is initially sufficiently long to allow for the removal of some of the extending end of said stem to provide for the alignment with said passageways.

4. In a method of cooling a mold through the steps of introducing a coolant into an opening in a mold by means of liquid flow connectors disposed in said opening and threaded therein and disposed in a chamber contiguous to said opening, and by means of positioning two flow tubes in two passageways extending in the mold to said chamber and then connecting the two flow tubes with the flow connectors, the improvement comprising providing a one-piece junction to serve as some of said flow connectors and having an integral threaded stem thereon and having two threaded openings with the axes thereof transverse to the elongate axis of said threaded stem, removing the extending end of said stem and forming tapered threads on the remaining end of said stem and to a thread size to be fluid tight in said opening, the remaining length of said stem being sufficient to have said stem fluid tightly threaded into said opening while the remainder of said junction is in said chamber and said two threaded openings are axially aligned with said two passageways, and connecting said two tubes to said two threaded openings.

5. The method of cooling a mold as claimed in claim 4, including the step of initially providing said stem with threads of a uniform diameter throughout the length of said stem and prior to removing said extending end of said stem, said uniform diameter being the same as the maximum pitch diameter of the threads in said opening.

* * * * *